United States Patent Office 3,171,849
Patented Mar. 2, 1965

3,171,849
ORGANOBIMETALLIC HYDRIDES OF GROUP
I-A AND II-B METALS AND PREPARATION
THEREOF
Paul Kobetz, Baton Rouge, La., assignor to Ethyl Corporation, New York, N.Y., a corporation of Virginia
No Drawing. Filed Mar. 29, 1961, Ser. No. 99,065
12 Claims. (Cl. 260—429.9)

The present invention is concerned with novel organometallic compounds and their preparation, especially complex bimetallic organometallic compounds.

Up until the present time, the only complex bimetallic organometallic compounds of metals of Group II–B of the Periodic Chart of the Elements which have been known were those exemplified by sodium triethylzinc. This compound was prepared previously by the reaction of ethyl sodium with diethyl zinc. Sodium triethylzinc, even though known for nearly 40 years, has found no commercial applications primarily because of the fact that the prior art processing required for its preparation is too tedious, costly, and not readily susceptible to commercial application. In particular, the alkyl sodium compound has had to be prepared by reacting, for example, alkali metal amalgam with an alkyl chloride and subsequent separation of the mercury or processing in the presence of mercury. This procedure results in the consumption of 2 moles of sodium in order to obtain only 1 mole of the alkali metal alkyl required. Another procedure which has been employed is the reaction of sodium with diethylmercury. In this method also, the mercury is an undesirable feature and the diethyl mercury is quite difficult to prepare. Additionally, the organo alkali metal compounds are quite hazardous for handling.

Attempts have also been made to react or, more appropriately dissolve alkali metal hydrides with certain alkyl zinc compounds. To date, such efforts have been futile. In particular, the reaction of sodium hydride with diethyl zinc at 0° or 50° C., in the absence of a solvent was attempted by Hein et al. (Z. Anorg. Allgem. Chemie, 141, p. 161 (1924)) and no solution of the sodium hydride in diethylzinc was obtained. On prolonged standing reduction took place. Additionally, attempts to effect reaction between a sodium hydride and diethylzinc in hydrocarbon diluents, such as toluene, have also resulted in no reaction taking place.

Therefore, it is highly desirable to the industry to provide complex alkali metal organozinc compounds, especially compounds from which alkali metal triorganozinc compounds can be readily produced since the latter are of considerable utility as will be brought forth hereinafter.

An object of the present invention is to provide novel complex bimetallic organometallic compounds. Another object is to provide a novel process for the manufacture of such compounds. A specific object is the provision of novel alkali metal hydride complexes with alkyl zinc compounds as well as a method for their manufacture. An even more specific object of the invention is the provision of the novel complex compound of sodium hydride with diethylzinc.

The above and other objects of the invention are accomplished by the reaction of an alkali metal hydride with an organo Group II-B metal compound wherein the metal has an atomic number between 30 and 48 inclusive in the presence of a reaction promoting solvent, especially a cyclic ether or a polyether. It has been found that such reaction promoting solvents, especially the ethers, are essential to the formation of complexes between the alkali metal hydrides and the indicated organo Group II–B metal compounds. Such complexes, for convenience, are also referred to herein as alkali metal organo Group II–B metal hydrides. Of the alkali metal hydrides, sodium hydride is especially preferred because of its greater availability, ease of formation, and reactivity. Of the organo Group II–B metal compounds, the dialkyl zinc compounds have been found most applicable and are thus preferred. Additionally, the lower alkyl ethers of diethylene glycol, especially the dimethyl ether of diethylene glycol, have been found to be most advantageous reaction promoting solvents in the process. A particularly preferred operating temperature is that between about 25 to 100° C. Thus, in an especially unique embodiment of this invention, a complex of one mole of sodium hydride with 2 moles of diethylzinc (more simply termed "sodium diethylzinc hydride") is obtained by reacting sodium hydride with diethylzinc in essentially the stoichiometric proportions of 1:2 moles respectively in the presence of the dimethyl ether of diethylene glycol at a temperature between about 25 to 100° C. This processing provides, for the first time, complexes of alkali metal hydrides with organo Group II–B metal compounds which are novel and of considerable utility and which also form a further embodiment of the invention.

Thus, the present invention provides novel complexes of alkali metal hydrides with the designated organo Group II–B metal compounds as well as an operable method for the reaction of an alkali metal hydride with the organo Group II–B metal compounds. Both of these features of the invention have been attempted in the past without success. Therefore, a long felt need is fulfilled. Among the further advantages of the process is the fact that despite the difficulties evidenced by the prior art attempts, the present process proceeds rapidly in essentially quantitative yields at moderate temperatures, such as room temperatures. These and other advantages will be evident as the discussion proceeds.

The metal hydride employed is a hydride of an alkali metal, that is a metal of Group I-A of the Periodic Chart of the Elements. Such hydrides include, for example, sodium hydride, potassium hydride, lithium hydride, rubidium hydride, or cesium hydride. These hydrides are prepared by conventional techniques as, for example, the direct reaction of the metal, preferably in finely divided form, with hydrogen. Sodium and potassium hydride, especially the former, comprise particularly preferred metal hydrides.

The organo Group II–B metal compounds employed are such compounds of the metals of Group II–B of the Periodic Chart of the elements having an atomic number between 30 and 48 inclusive. They are preferably liquid in the reaction system. Likewise, they can be either aliphatic, alicyclic, preferably saturated, or aromatic organo Group II–B metal compounds having only metal to carbon bonding. Thus, typical examples of the organo Group II–B metal compounds include dimethyl zinc, diethyl zinc, di-n-propyl zinc, di-n-butyl zinc, dioctyl zinc, dioctadecyl zinc, di-3-hexenyl zinc, di-5-hexynyl zinc, dicyclohexyl zinc, dicyclohexenyl zinc, diphenyl zinc, di-o-tolyl zinc, dibenzyl zinc, dinaphthyl zinc, ethyl methyl zinc, and the like and other compounds wherein cadmium is substituted for zinc. In general, the hydrocarbon groups of such compounds will contain up to and including about 20 carbon atoms and they can be further substituted provided such substituents are essentially inert in the reaction with the alkali metal hydride. The dialkyl zinc or cadmium compounds, especially those wherein the alkyl groups have up to and including about 10 carbon atoms are preferred because of their easier preparation and applicability to the process. Particularly preferred embodiments comprise the dialkyl zinc compounds: dimethyl-, diethyl-, di-n-propyl-, and di-n-butyl zinc.

It has been found that in order for the reaction of the alkali metal hydride to proceed with the organo Group II–B metal compound, a reaction promoting solvent should be employed. While in general any reaction promoting solvent can be employed, it has been found that the polyethers produce the best results. Some criteria of choice of the reaction promoting solvents are that they be essentially inert to the reactants although they can form complexes therewith, liquid under the reaction conditions, preferably at room temperature, or soluble in the reaction mixture. Likewise, although commercial forms of such solvents are employable, it is preferred that they be essentially anhydrous and alcohol free in order to avoid wasting of the reactants. Thus, examples of the polyethers which are employable include the ethers of glycols having the configuration

wherein R is an organic radical, preferably saturated hydrocarbon or ether radicals having up to and including about 10 carbon atoms, and $n$ is a small whole number as between about 1 to 10, preferably 1 to 4 inclusive. For example, such polyethers include ethylene glycol ethyl methyl ether, diethyl ether of ethylene glycol, methyl-n-propyl ether of ethylene glycol, dimethyl ether of tetraethylene glycol, the dimethyl ether of diethylene glycol, the diethyl ether of diethylene glycol, the dibutyl ether of diethylene glycol, diphenyl ether of diethylene glycol, dicyclohexyl ether of diethylene glycol, and the like. Other polyethers which are employable include, for example, pyrocatechol dimethyl ether, resorcinol methyl ether, 1,2,4-trimethoxybenzene, and the like. In general, such ethers will contain only carbon, hydrogen, and oxygen, although it is to be understood that they can be further substituted provided such substituents are inert in the reaction. The lower alkyl glycol ethers, especially those of ethylene glycol and diethylene glycol wherein the alkyl groups contain up to and including about 4 carbon atoms, have been found to give the most beneficial results. In this connection, the dimethyl ether of diethylene glycol, the diethyl ether of diethylene glycol, and ethyl methyl ether of diethylene glycol comprise especially preferred embodiments. It is to be understood that the ethers need not be pure but can be mixtures of the various ethers discussed previously, for example, a mixture of the diethyl and the dimethyl ether of diethylene glycol.

Illustrative of other reaction promoting solvents which can be employed are the amines. Included among the amines are the primary, secondary, tertiary and heterocyclic amines as for example ethyl amine, propyl amine, diethyl amine, dipropyl amine, dicyclohexyl amine, diphenyl amine, triphenyl amine, triethyl amine, myristyl diethyl amine, pyridine, cyclohexylamine, aniline, dimethylaniline, tribenzyl amine, ethylenediamine, quinuclidine, and the like. Thus, the amines also will generally only contain carbon, hydrogen, and nitrogen although they can be further substituted provided such substituents are inert in the principal reaction. The tertiary amines, especially the trialkyl amines wherein each alkyl group has up to and including about 4 carbon atoms are most suitable. Triethyl amine comprises an especially preferred embodiment. The polyethers and cyclic ethers, described hereinbefore, are preferred even over the amines since better results are obtained.

While the above discussion of the reaction promoting solvents has been confined to the designated ethers and amines with the former being especially preferred, other raction promoting solvents are employable although less preferred. In general, other Lewis bases are employable which are essentially inert in the reaction in the sense that they do not degrade the reactants or products. Such other Lewis bases of the type described, for example, by Noller in "Chemistry of Organic Compounds," W. B. Saunders Co., 1951, at page 234, and the article by Stone in "Chemical Review," vol. 58, 1958, at page 101 can be employed.

Likewise, it has been found that economies can be effected while still obtaining the benefits of the reaction promoting solvents by their employment in admixture with other solvents or suspending media, for example, the hydrocarbons which are particularly preferred. Typical examples of such hydrocarbons are the liquid hydrocarbons as the nonanes, octadecanes, hexanes, toluene, benzene, xylene, and mixed hydrocarbons such as gasoline, diesel oil and the like petroleum fractions.

The proportions of reactants or reaction promoting solvents employed are not necessarily critical, but will affect the yield obtained. For example, some alkali metal hydride complex with organo Group II–B metal compound is obtained when only a minor amount of the alkali metal hydride is reacted with the organo Group II–B metal compound or vice versa. In general, however, it is preferred to employ at least 2 moles of the organo Group II–B metal compound per mole of the alkali metal hydride compound. In a particularly preferred embodiment between about 2 moles and 10 percent in excess thereof of the organo Group II–B metal compound per mole of the alkali metal hydride is employed. The amount of reaction promoting solvent employed is subject to considerable latitude. For example, some beneficial effect is obtained when minor amounts, e.g. catalytic amounts, as about 0.1 part per part by weight of the alkali metal hydride are employed. The solvent is generally employed in amount sufficient to slurry the metal hydride when it is a solid under reaction conditions or to provide a fluid reaction system. For convenience then, the solvent is based upon the metal hydride employed and is usually employed in amounts between about 5 to 100 parts per part by weight of the metal hydride. Improved results are obtained when the solvent is used in amounts between about 10 to 75 parts per part by weight of the metal hydride, and such amounts are therefore preferred.

The novel products of this invention comprise complexes of the alkali metal hydride with the designated organo Group II–B metal compounds. The preferred complexes are those wherein the reactants result in a product having the proportions of two moles of organo Group II–B metal compound per mole of alkali metal hydride. Additionally, another embodiment of the novel products comprise such complexes further complexed with the reaction promoting solvent, especially the polyethers and cyclic ethers. Thus, typical examples of the novel products of this invention comprise the complex of two moles of diethyl zinc with 1 mole of sodium hydride, 2 moles of dimethyl zinc with 1 mole of sodium hydride, 2 moles of di-n-propyl zinc with 1 mole of sodium hydride, 2 moles of di-n-butyl zinc with 1 mole of sodium hydride, 2 moles of di-3-heptenyl zinc with 1 mole of sodium hydride, 2 moles of di-3-hexynyl zinc with 1 mole of sodium hydride, 2 moles of dicyclohexyl zinc with 1 mole of sodium hydride, and the like and other compounds wherein cadmium is substituted for zinc and the other alkali metals as, for example, lithium, potassium, rubidium, and cesium are substituted for sodium as well as the reaction promoting solvent complexes of such compounds with 1, 2 or 3 moles of the reaction promoting solvent, especially the polyethers and cyclic ethers, per mole of the alkali metal hydride-organo Group II–B complex (alkali metal organo Group II–B hydride) such as the dimethyl ether of diethylene glycol, the diethyl ether of diethylene glycol, the dibutyl ether of diethylene glycol, ethyl methyl ether of diethylene glycol, tetrahydrofuran, dimethoxyethane, dioxane, and the like. Particularly preferred among the novel compositions of this invention are such alkali metal hydrides complexed with the dialkyl zinc compounds wherein the alkyl groups contain up to and including about 6 carbon atoms, especially the 2:1 molar complexes of dimethyl-, diethyl-, and dibutylzinc with sodium hydride. Another especially preferred embodiment comprises the latter mentioned complexes further complexed with the ethers, the dimetyl ether of diethylene glycol, the diethyl ether of diethylene glycol, and tetrahydrofuran. The ether complexes are of particular advantage since they are employable in conducting reactions at higher temperatures than the simple alkali metal complexes with the organo Group II–B metal compound.

As indicated above, for convenience, simplicity, and universal understanding, the alkali metal hydride complexes with the organo Group II–B compounds are also referred to as "alkali metal organo Group II–B metal hydrides." For example, the 2:1 molar complex of diethyl zinc with sodium hydride (NaH·2Zn(C$_2$H$_5$)$_2$) is more conveniently referred to as "sodium diethylzinc hydride." Likewise the ether complexes are also more simply termed "etherates" e.g. sodium diethyl zinc hydride diethyl etherates. Thus, in each instance when so referred to, what is intended are the complexes of alkali metal hydrides and organo Group II–B compounds and their ether complexes as described herein.

The process of this invention and the novel products produced thereby will be more completely understood from the following examples. In each instance, all parts are by weight unless otherwise specified.

Example I

Employing a reactor equipped with internal agitation, external heating, and a means for maintaining a nitrogen blanket, there was added thereto 43 parts of dimethoxy-ethane and 11.8 parts of diethyl zinc. Then, 2.6 parts of sodium hydride were added to the reactor and the mixture heated to reflux temperature and maintained at these conditions for 6 hours. The mixture was then cooled to room temperature and allowed to stand overnight. The reaction mixture was then filtered to remove excess sodium hydride and the solids were then washed with 86 parts of dimethoxy-ethane. A portion of the liquid filtrate was hydrolyzed and the gases collected for analysis by mass spectroscopy. Such analysis showed 19.7 mole percent hydrogen and 80.3 mole percent ethane or a ratio of 1:4 respectively. This indicated that the compound formed comprised a complex of 2 moles of diethyl zinc with 1 mole sodium hydride (NaH·2Zn(C$_2$H$_5$)$_2$) dissolved in the dimethoxyethane. Chemical analysis of a portion of the product in the dimethoxy-ethane solution showed that the product contained 1.25 parts sodium whereas theoretically the sodium diethylzinc hydride $$(NaH·2Zn(C_2H_5)_2)$$

would contain 1.12 parts sodium based on the amount of diethyl zinc employed. Upon so testing, a portion of the product was found to be highly reactive with water liberating hydrogen. It is also soluble in ethers in general.

Example II

In this run 1.1 parts of sodium hydride were added over a 15 minute period to 11.8 parts of zinc diethyl at room temperature in 43 parts of dimethyl ether of ethylene glycol. The reaction was instantaneous with all the sodium hydride going into solution. Thus, the complex NaH·2ZnEt$_2$ was prepared. An attempt was then made to add additional sodium hydride. Two grams of sodium hydride were added slowly to the reaction mixture and none dissolved or reacted proving the complex $$NaH·2ZnEt_2$$

was prepared.

Example III

In this run, 1.3 parts of sodium hydride were reacted with 5.9 parts of diethyl zinc in 140 parts of the dimethyl ether of diethylene glycol. The reaction mixture was heated to 80° C. and maintained at this temperature for 1 hour and then filtered to remove the excess sodium hydride. In this manner, NaH·2Zn(C$_2$H$_5$)$_2$ was obtained in essentially quantitative yield.

Example IV

Example III is repeated essentially as described with exception that an equivalent amount of dimethoxyethane is substituted for the dimethyl ether of diethylene glycol. At the completion of the reaction, the reaction mixture is then carefully subjected to distillation at 78° C. and atmospheric pressure in an attempt to remove all the dimethoxyethane from the reaction product. It is found that all of the dimethoxyethane is not removed from the complex and that a complex of 1 mole of dimethoxyethane per mole of sodium diethyl zinc hydride $$(NaH·2Zn(C_2H_5)_2)$$

remains.

In contrast to the results obtained in the above examples, an attempt was made to conduct the reaction in the absence of a reaction promoting ether solvent and substituting benzene as the solvent. In this instance, no complexation or reaction took place upon mixing nor upon refluxing the mixture for 3 hours. However, when dimethyl ether of ethylene glycol was added to the benzene solution, the solution warmed to 79–80° C., showing reaction. The benzene-ether mixture was heated an additional 3 hours at reflux (78° C.). Upon filtration of the reaction mixture and determination of the amount of sodium hydride that reacted and went into solution, it was determined that sodium diethyl zinc hydride $$(NaH·2Zn(C_2H_5)_2)$$

was obtained.

Additionally, when attempts were made to react sodium hydride with diethyl zinc employing a more simple ether, particularly diethyl ether, under the same conditions, no reaction took place to result in the formation of the corresponding complex.

Example V

Essentially 2 moles of dibutyl zinc are reacted with 1 mole of potassium hydride in the presence of 1 mole of the ethyl methyl ether of diethylene glycol at room temperature for 2 hours. In this manner, a solution of the complex of potassium hydride with dibutyl zinc in a 1:2 molar ratio, respectively, in the ether is obtained in high yield.

Example VI

When di-n-propyl zinc is reacted with lithium hydride in molar proportions of essentially 2:1 respectively, employing an equivalent amount by weight of the diethyl ether of ethylene glycol as the solvent at 100° C. for one hour, an essentially quantitative yield of a solution of the complex lithium dipropyl zinc hydride, LiH·2Zn(C$_3$H$_7$)$_2$, in the ether is obtained.

When any of the above examples are repeated employing other polyethers as, for example, dimethyl ether of methylene glycol, dimethyl ether of triethylene glycol, dimethyl ether of tetraethylene glycol, and the like, equally satisfactory results are obtained.

Example VII

The complex in the ratio of 2 moles of di-3-hexenyl zinc with 1 mole of sodium hydride is obtained when di-3-hexenyl zinc is reacted with sodium hydride in proportions of at least 2 moles of the former per mole of the latter employing tetrahydrofuran as the solvent.

Similar results are obtained when the above example is repeated substituting an equivalent amount of di-3-butenyl zinc, di-4-octenyl zinc, dicyclohexenyl zinc, and the like for the di-3-hexenyl zinc.

*Example VIII*

Employing the procedure of Example I, diphenyl zinc is reacted with sodium hydride in proportions of essentially 2 moles of the former per mole of the latter employing essentially 4 moles of dioxane per mole of the sodium hydride as a solvent, the dioxane etherate of the complex of 2 moles of diphenyl zinc with 1 mole of sodium hydride, sodium diphenylzinc hydride (NaH·2Zn$\phi_2$), dioxane etherate, dissolved in the excess dioxane is obtained.

When the above example is repeated substituting dibenzyl zinc, ditolyl zinc, dixylyl zinc, dinaphthyl zinc, and the like for diphenyl zinc, the corresponding complexes are obtained.

*Example IX*

When essentially 2 moles of diethyl cadmium are reacted with 1 mole of cesium hydride employing tetrahydropyran as the solvent at 50° C. for one hour, the corresponding complex, cesium diethyl cadmium hydride (CsH·2Cd($C_2H_5$)$_2$) is obtained in good yield dissolved in the ether.

When the above example is repeated substituting dimethyl cadmium, dipropyl cadmium, dibutyl cadmium, diisoamyl cadmium, diphenyl cadmium, di-3-pentenyl cadium and the like for diethyl cadmium, the corresponding complexes are obtained.

*Example X*

Essentially two moles of diethyl zinc are reacted with essentially one mole of sodium hydride at 70° C. for 2 hours employing triethylamine as a solvent. In this manner, sodium diethyl zinc hydride, (NaH·2Zn($C_2H_5$)$_2$), in solution in the triethylamine is obtained.

When this example is repeated employing other amines as, for example, ethylene diamine, quinuclidine, trimethylamine, pyridine and the like, good results are also obtained.

The above examples are presented by way of illustration and it is not intended to be limited thereto. It will now be evident that other organo Group II–B metal compounds, alkali metal hydrides, and reaction promoting solvents as described hereinbefore can be substituted to produce equally satisfactory results.

The reaction between the metal hydride and the organo Group II–B metal compound is self-sustaining and will readily initiate upon mere admixture of the materials. This unique feature is attributable to use of the unique reaction promoting solvents. In general, temperatures between about 25 to 200° C. are preferably employed for fastest reaction rates while still avoiding undesirable side reactions. In order to obtain best results reaction temperatures between 25 to 100° C. are employed. Although the above examples have demonstrated the preferable use of atmospheric pressure, it is to be understood that pressures below and above atmospheric can be employed. Likewise, at temperatures above about 150° C., pressure can be used to advantage in those instances where the product is susceptible to degradation. In general, pressures between about atmospheric to 500 p.s.i. are employed when so required.

As demonstrated by the examples, the reaction is essentially instantaneous in most instances. Ordinarily reaction times less than a period of about 5 hours are employed, but generally times between about ¼ to 2 hours are preferred. Longer reaction times at temperatures above 100° C. are to be avoided since some degradation of the product may occur.

It is not necessary to isolate the complex metal organo Group II–B metal hydride from the reaction mixture since it is employable as obtained. If it is desirable to isolate the product such can be done readily by filtering any solids and evaporation or distillation of the reaction promoting solvent and excess organo Group II–B metal reactant when employed. Likewise, the product can be purified to only contain the complex metal organo Group II–B hydride in solution in the reaction promoting solvent by vacuum distilling any excess organo Group II–B reactant when employing a lower boiling solvent. A solution of the product in the reaction promoting solvent is a very effective form for its employment. Since the product is highly reactive, it should be kept in an inert atmosphere or blanketed by inert liquids.

The novel products produced according to the process of this invention are of considerable utility. By way of example, they are quite useful as hydrogen generators or hydrogenation materials. As indicated above, when sodium diethyl zinc hydride, or its complex with a reaction promoting solvent, is added to water, hydrogen is generated in a uniform and efficient manner. Further, the novel products can be readily olefinated to produce more fully alkylated materials by reaction with an appropriate olefin at temperatures varying between about 25 to 200° C. A typical example of this use is the formation of sodium triethyl zinc by reacting the product of Example I with ethylene at a pressure of about 400 p.s.i. for one hour at 90° C. The products so obtained, e.g. sodium triethyl zinc or its etherates, can be reacted with metal salts, in particular lead salts to produce the corresponding organolead compounds. For example, the reaction of lead acetate with sodium triethyl zinc produces tetraethyllead in good yield. Other uses of the products of this invention will now be evident.

Having thus described the novel process and products of this invention, it is not intended that it be limited except as set forth in the following claims.

I claim:

1. As new compositions, complexes of alkali metal hydrides with hydrocarbon Group II–B metal compounds wherein the metal has an atomic number between 30 and 48 inclusive and wherein one molecule of the alkali metal hydride is coordinated with two molecules of the hydrocarbon Group II–B metal compound.

2. The composition of claim 1 wherein the hydrocarbon Group II–B metal compound is diethyl zinc.

3. The composition of claim 1 wherein the hydrocarbon Group II–B metal compound is diethyl cadmium.

4. The composition of claim 1 wherein the alkali metal hydride is sodium hydride.

5. The complex compound of essentially two moles of diethyl zinc with one mole of sodium hydride.

6. A process for the manufacture of alkali metal complexes of hydrocarbon Group II–B compounds, containing alkali metal hydride and hydrocarbon Group II–B metal compound in the proportion of essentially one mole of the former to two moles of the latter, which comprises reacting, at a temperature of from about 25° to about 200° C., a hydrocarbon Group II–B metal compound wherein the metal has an atomic number between 30 and 48, inclusive, with an alkali metal hydride in the presence of a polyether, liquid under the reaction conditions and essentially inert with respect to the reactants and products.

7. The process of claim 6, wherein said temperature range is from about 25° to about 100° C.

8. The process of claim 6 wherein the hydrocarbon Group II–B metal compound is diethyl zinc.

9. The process of claim 6 wherein the hydrocarbon Group II–B metal compound is diethyl cadmium.

10. The process of claim 6 wherein the alkali metal hydride is sodium hydride.

11. The process of claim 6 wherein the ether is the dimethyl ether of diethylene glycol.

12. A process for the manufacture of the sodium hydride complex with diethyl zinc which comprises reacting sodium hydride with at least 2 moles of diethyl zinc per mole of said sodium hydride in the presence of the dimethyl ether of diethylene glycol at a temperature between about 25 to 100° C.

References Cited in the file of this patent

UNITED STATES PATENTS

| | | |
|---|---|---|
| 2,786,860 | Ziegler et al. | Mar. 26, 1957 |
| 2,989,557 | Blitzer et al. | June 20, 1961 |

OTHER REFERENCES

Justus Liebig's "Annalen der Chemie," vol. 577 (1952), pages 19–20.

Chemical Reviews, vol. 54 (1954), page 869.